United States Patent
Kornmeyer

(10) Patent No.: US 8,747,981 B2
(45) Date of Patent: Jun. 10, 2014

(54) FORM AND FORCE LOCKING CONNECTION OF SPECIAL GRAPHITE PARTS TO FORM MULTI-PART GRAPHITE COMPONENTS

(75) Inventor: Torsten Kornmeyer, Koenigswinter (DE)

(73) Assignee: KGT Graphit Technologie GmbH, Windhagen (DE)

( * ) Notice: Subject to any disclaimer, the term of this patent is extended or adjusted under 35 U.S.C. 154(b) by 224 days.

(21) Appl. No.: 13/322,051

(22) PCT Filed: Mar. 17, 2010

(86) PCT No.: PCT/EP2010/053444
§ 371 (c)(1),
(2), (4) Date: Jan. 18, 2012

(87) PCT Pub. No.: WO2010/139494
PCT Pub. Date: Dec. 9, 2010

(65) Prior Publication Data
US 2012/0114882 A1   May 10, 2012

(30) Foreign Application Priority Data
Jun. 3, 2009 (DE) .......................... 10 2009 023 708

(51) Int. Cl.
*B32B 3/10* (2006.01)

(52) U.S. Cl.
USPC .............................................. 428/61; 428/60

(58) Field of Classification Search
USPC .............................................. 428/60, 58, 61
See application file for complete search history.

(56) References Cited

U.S. PATENT DOCUMENTS

| 5,634,645 A * | 6/1997 | Seki et al. ..................... 277/608 |
| 6,952,438 B2 | 10/2005 | Montminy et al. |
| 2006/0222805 A1 * | 10/2006 | Mosher et al. .................. 428/58 |

FOREIGN PATENT DOCUMENTS

| DE | 1042775 B | 11/1958 |
| DE | 1247501 B | 8/1967 |
| DE | 3226301 A1 | 1/1984 |
| DE | 3907913 A1 | 9/1990 |
| DE | 202005011631 U1 | 10/2005 |
| DE | 602004006939 T2 | 3/2008 |
| EP | 0388666 A1 | 9/1990 |

OTHER PUBLICATIONS

International Search Report for PCT/EP2010/053444 dated Jun. 24, 2010.
National Examination Report/Search Report in corresponding Chinese Application No. 201080024443.4 dated Dec. 17, 2013.

* cited by examiner

*Primary Examiner* — Alexander Thomas
(74) *Attorney, Agent, or Firm* — Heslin Rothenberg Farley & Mesiti P.C.

(57) ABSTRACT

A form and force locking connection of special graphite parts is provided to form multi-part components, at which the joints/connection point has almost the same physical properties as the material surrounding the connection point. The form and force locking connection is achieved by the graphite parts being interlocked at the opposing front surfaces in a three-dimensional manner, so that one front surface of a first graphite part has the positive form of the interlocking and the front surface of a second opposing graphic part has the negative form of the interlocking, and the interlocking exclusively has evenly transitioned contours between side surfaces of the graphite parts.

8 Claims, 2 Drawing Sheets

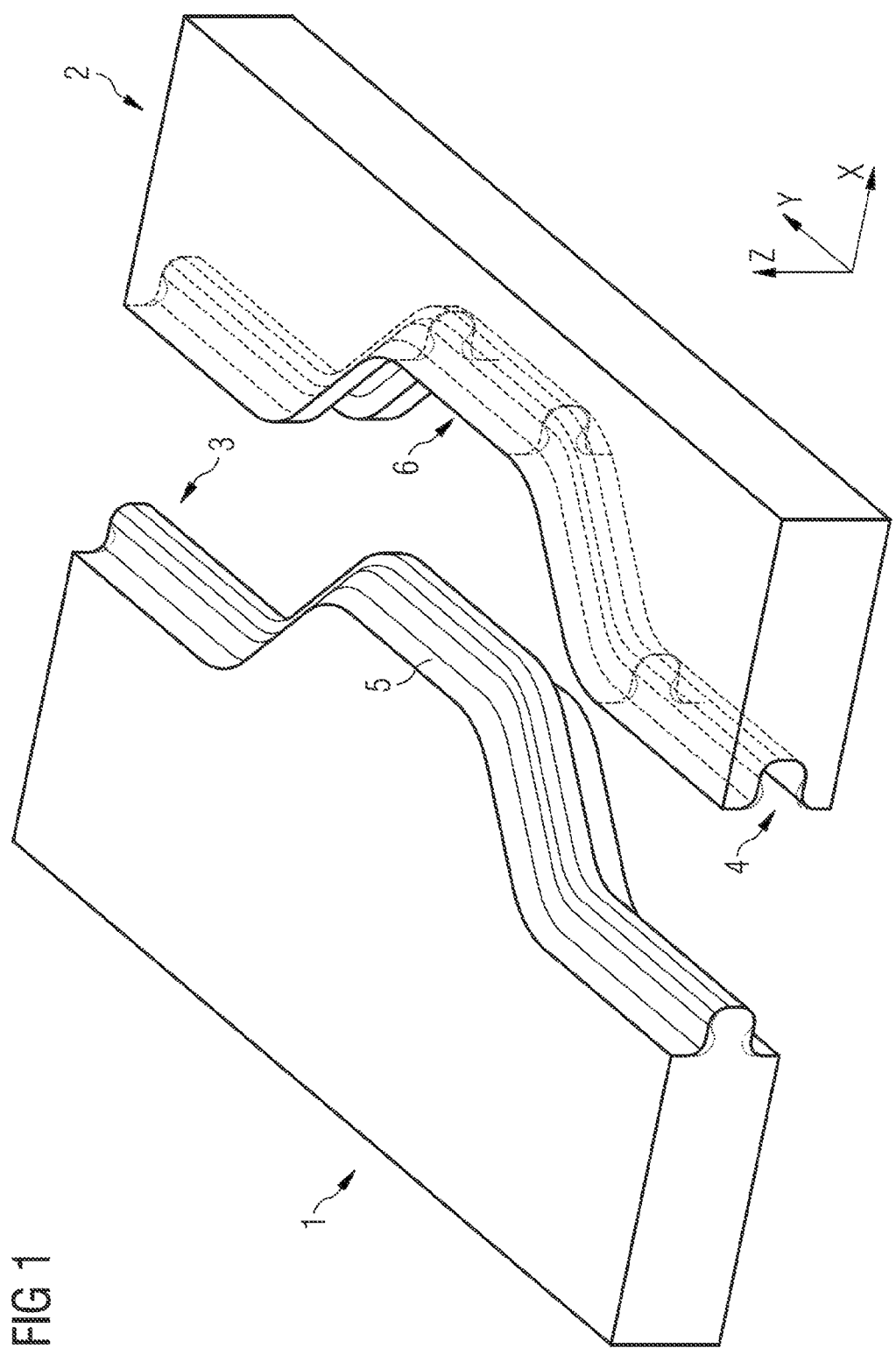

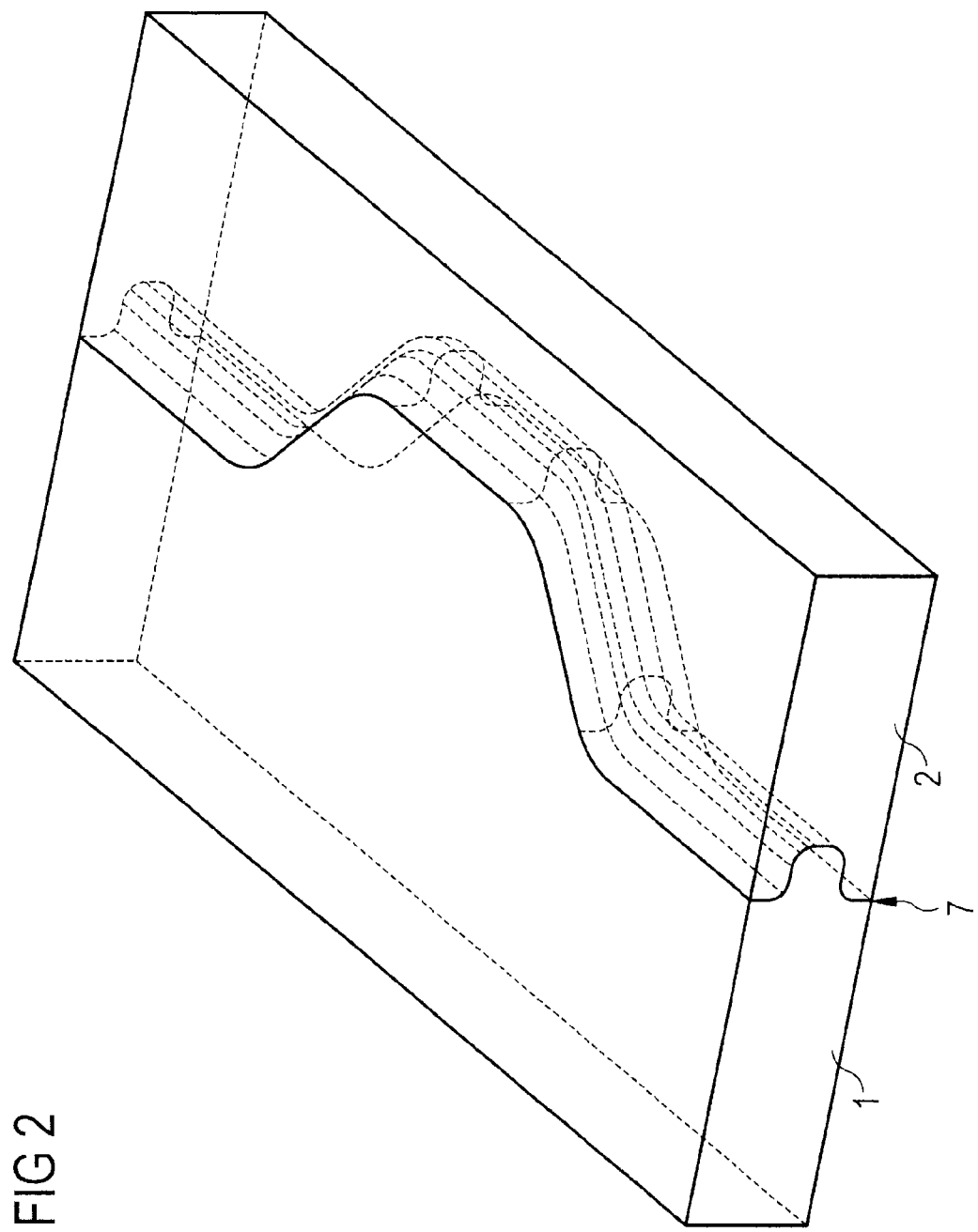

FORM AND FORCE LOCKING CONNECTION OF SPECIAL GRAPHITE PARTS TO FORM MULTI-PART GRAPHITE COMPONENTS

CROSS REFERENCE TO RELATED APPLICATIONS

This application is a national stage filing under section 371 of International Application No. PCT/EP2010/053444 filed on Mar. 17, 2010, and published in English on Dec. 9, 2010 as WO 2010/139494 A1 and claims priority of German application No. 10 2009 023 708.9 filed on Jun. 3, 2009, the entire disclosure of these applications being hereby incorporated herein by reference.

BACKGROUND ART

The invention relates to a form and force locking connection of special graphite parts to form multi-part graphite components, for example of two or more graphite plates or similar components to form one larger component, such as a flat graphite plate.

It is technically difficult or impossible to produce particularly large graphite components from one piece. For this reason, smaller graphite components are pieced together by means of known connection processes to form larger components. These can be larger plates or else other structural parts, such as housing parts or the like. In this case, use is primarily made of overlaps or tongue-and-groove connections. In addition, these connections can be fixed by pinning, screwing or else adhesive bonding.

As an example for the connection of graphite components, reference is made to DE 39 07 913 A1. This document describes a special adhesive for the connection of graphite components for producing permanent adhesive connections. By way of example, two graphite plates which can be snapped together at a right angle by tongue and groove are adhesively bonded to one another.

In this way, it is also possible to connect a plurality of graphite plates to one another to form a large-area graphite plate. It is disadvantageous here that the transmission of mechanical stresses at the connection site can only be taken into account insufficiently.

In the case of such connection techniques, the material-specific properties of the graphite components in most cases cannot be taken into account, or at least can only be taken into account insufficiently. In any case, the material properties determine restrictions in the shaping and dimensioning of the graphite components. Thermally and/or mechanically induced stress profiles in the material and at the connection sites can only be taken into account to a limited extent.

This means that it is sometimes necessary to overdimension the graphite components to be connected to one another, in order to prevent stresses at the connection site from causing fracture of the material.

Ideally, the connection site should have the same physical properties as the surrounding, solid material.

The invention is thus based on the object of providing a form and force locking connection between special graphite parts to form multi-part graphite components, in which the disadvantages of the prior art do not arise and in which the joining/connection site has virtually the same physical properties as the solid material surrounding the connection site.

BRIEF SUMMARY OF INVENTION

The object on which the invention is based is achieved in that the graphite plates are interlocked at the opposing front sides in a three-dimensional manner, in such a manner that one front side of a graphite plate has the positive form of the interlocking and the front side of the opposite graphite plate has the negative form of the interlocking, wherein the interlocking has exclusively even transitions of the contours into one another between the side surfaces of the graphite plates.

In a first configuration of the invention, the interlocking extends continuously over the entire extent of the front surfaces. A uniform strength and application of force is thereby ensured over the entire extent of the connection site.

The interlocking is formed at least in the X/Y direction, but preferably in the X/Y direction and in the X/Z direction and also in the Y/Z direction.

In a second development, the contours have slight undercuts in the X/Y/Z direction, as a result of which a virtually complete form and force locking connection is achieved.

In addition, the front sides can be fixed by way of pins and moreover can be adhesively bonded to one another.

It has quite surprisingly been found that all the problems of the prior art can be avoided with the configuration of the connection site according to the invention.

The invention ensures that all the stresses which arise at the connection sites are deflected uniformly in all vectors into the surrounding material, and therefore the physical properties are only insignificantly influenced.

Furthermore, the invention ensures that there is a good force and form locking connection, such that additional connection elements, such as screws and pins, are not required. At the same time, it is possible to realize a non-releasable connection by virtue of additional pins or adhesives.

BRIEF DESCRIPTION OF DRAWING FIGURES

The invention will be explained in more detail hereinbelow on the basis of an exemplary embodiment. In the associated drawings:

FIG. 1: shows two graphite plates equipped according to the invention, and the opposing front sides thereof which are equipped with an interlocking; and FIG. 2: shows the graphite plates shown in FIG. 1 joined together.

DETAILED DESCRIPTION

As shown in FIG. 1, two graphite plates 1, 2 are interlocked at the opposing front sides 3, 4 in a three-dimensional manner, in such a manner that one front side 3 of a graphite plate 1 has the positive form of the interlocking 5 and the front side 4 of the opposite graphite plate 2 has the negative form of the interlocking 6. The interlocking 5, 6 has exclusively even transitions of the contours into one another between the side surfaces of the graphite plates 1, 2.

The interlocking 5, 6 extends continuously over the entire extent of the front surfaces 3, 4, such that a uniform strength and application of force is ensured over the entire extent of the connection surface 7 of the front surfaces 3, 4 in the assembled state (FIG. 2).

In the preferred embodiment, the interlocking is formed in the X/Y direction and in the X/Z direction and also in the Y/Z direction, as is apparent from FIG. 1.

The interlocking can be formed with an omega-like cross section and, in the longitudinal direction, can adopt the form of a sine curve which, in the exemplary embodiment, is interrupted by straight portions in the longitudinal extent.

In a second development, the contours have slight undercuts in the X/Y/Z direction. In order to achieve a virtually complete form and force locking connection when piecing the graphite plates 1, 2 together, the contours are formed with slight undercuts in the X/Y/Z direction.

In addition, after the graphite plates 1, 2 have been pieced together, the front sides 3, 4 can be fixed by way of pins (not shown), which in each case extend through the profile of both interlockings 5, 6.

It goes without saying that it is also possible to connect the graphite plates 1, 2 to one another via the interlocking and to pin them to one another and additionally to permanently connect them to one another using a suitable adhesive.

The invention ensures that all the stresses which arise at the connection sites of the interlocking 5, 6 are deflected uniformly in all vectors into the surrounding material of the graphite plates 1, 2, and therefore the physical properties are only insignificantly influenced.

Furthermore, the invention ensures that there is a good force and form locking connection, such that additional connection elements, such as screws and pins, are not required per se. At the same time, it is possible to realize a non-releasable connection of the graphite plates 1, 2 by virtue of additional pins and adhesive bonding.

It shall be understood that the invention does not necessarily extend just to planar graphite plates, as shown in the exemplary embodiment, but instead it can be used correspondingly for bent plates or else for the connection of pipes or otherwise profiled articles.

Furthermore, the interlocking 5, 6 does not necessarily have to extend over the entire area of the front sides 3, 4, but rather can also be interrupted if required, e.g. for leadthroughs or the like.

The invention claimed is:

1. A form and force locking connection of graphite parts to form multi-part graphite components, wherein the graphite parts are interlocked at opposed connecting surfaces in a three-dimensional manner, such that a connecting surface of a first graphite part has a positive form of an interlocking and a connecting surface of a second opposite graphite part has a negative form of the interlocking, wherein each connecting surface of a part extends between an opposite pair of side surfaces of the part, and the interlocking has exclusively smooth transitions of contours into one another between the side surfaces of the graphite parts, the interlocking being formed in an X/Y plane, an X/Z plane and a Y/Z plane, where X, Y and X designate orthogonal directions.

2. The form and force locking connection as claimed in claim 1, wherein the interlocking extends continuously over an entire extent of the connecting surfaces.

3. The form and force locking connection as claimed in claim 1, wherein the interlocking is formed in an X/Y plane.

4. The form and force locking connection as claimed in claim 1, wherein the contours of the interlocking has a slight undercut in at least one of the X, Y and Z directions.

5. The form and force locking connection as claimed in claim 1, wherein the connecting surfaces are adhesively bonded to one another.

6. The form and force locking connection as claimed in claim 1, wherein the connecting surfaces are fixed with pins.

7. The form and force locking connection as claimed in claim 1, wherein the graphite parts comprise graphite plates.

8. The form and force locking connection as claimed in claim 1, wherein the interlocking has an omega shape in the X/Z plane and a sine curve shape, interrupted by straight portions, in the X/Y plane.

\* \* \* \* \*